(12) United States Patent
Hasegawa (10) Patent No.: US 9,840,290 B2
(45) Date of Patent: Dec. 12, 2017

(54) RECTIFYING DEVICE

(71) Applicant: FUJI JUKOGYO KABUSHIKI KAISHA, Tokyo (JP)

(72) Inventor: Takumi Hasegawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/063,164

(22) Filed: Mar. 7, 2016

(65) Prior Publication Data
US 2016/0280288 A1    Sep. 29, 2016

(30) Foreign Application Priority Data
Mar. 26, 2015    (JP) ................................. 2015-064602

(51) Int. Cl.
*B62D 35/02* (2006.01)
*B62D 37/02* (2006.01)
*B60G 7/00* (2006.01)

(52) U.S. Cl.
CPC .............. *B62D 35/02* (2013.01); *B60G 7/001* (2013.01); *B62D 37/02* (2013.01); *B60G 2204/4308* (2013.01)

(58) Field of Classification Search
CPC ........ B62D 35/02; B62D 37/02; B60G 7/001; B60G 2204/4308
See application file for complete search history.

(56) References Cited

U.S. PATENT DOCUMENTS

| | | | |
|---|---|---|---|
| 5,419,608 A | 5/1995 | Takemoto | |
| 5,954,405 A * | 9/1999 | Toman | B60R 11/00 188/264 AA |
| 6,196,620 B1 * | 3/2001 | Haraway, Jr. | B62D 35/007 180/903 |
| 7,654,544 B2 * | 2/2010 | Lounsberry | B60G 7/001 280/124.134 |
| 9,415,650 B2 * | 8/2016 | Bromme | F16D 65/128 |

(Continued)

FOREIGN PATENT DOCUMENTS

| | | | | |
|---|---|---|---|---|
| DE | 3110991 A1 * | 5/1982 | ............. | B60G 7/001 |
| DE | 4214912 A1 * | 11/1993 | ............. | B62D 35/02 |

(Continued)

OTHER PUBLICATIONS

Machine language translation of DE 3110991, obtained Apr. 27, 2017.*

(Continued)

*Primary Examiner* — Ruth Ilan
(74) *Attorney, Agent, or Firm* — Chip Law Group (57) ABSTRACT

A rectifying device includes a rectifying member that is provided on a rear side of a vehicle with respect to a constituent member of a suspension device to extend substantially along a vehicle width direction and project downward. The constituent member of the suspension device is disposed to at least partly project from an underside part of a vehicle body and has a lower end disposed to be inclined in a front view of the vehicle. A lower edge of the rectifying member projects downward beyond the constituent member, and is inclined in a same direction as the lower end of the constituent member in the front view of the vehicle.

5 Claims, 4 Drawing Sheets

(56) References Cited

U.S. PATENT DOCUMENTS

| | | | | |
|---|---|---|---|---|
| 2005/0167179 A1* | 8/2005 | Hasegawa | ................ | B60G 3/20 |
| | | | | 180/348 |
| 2016/0257353 A1* | 9/2016 | Tesch | ..................... | B62D 35/02 |
| 2016/0280284 A1* | 9/2016 | Scholz | .................. | B62D 35/02 |

FOREIGN PATENT DOCUMENTS

| | | | | | |
|---|---|---|---|---|---|
| DE | 10 2011056319 A1 | * | 6/2013 | ................ | B60T 5/00 |
| EP | 2476565 A | | 7/2012 | | |
| EP | 2476565 A1 | * | 7/2012 | | |
| JP | 02-108676 U | | 8/1990 | | |
| JP | 06-171554 A | | 6/1994 | | |
| JP | 2001-018851 A | | 1/2001 | | |
| JP | 2004-306935 A | | 11/2004 | | |
| JP | 2006-076441 A | | 3/2006 | | |
| JP | 2007-022149 A | | 2/2007 | | |
| JP | 2009-090681 A | | 4/2009 | | |
| JP | 2009-234331 A | | 10/2009 | | |
| JP | 2009-248746 A | | 10/2009 | | |
| JP | 2011-057147 A | | 3/2011 | | |
| JP | 2011-218939 A | | 11/2011 | | |
| JP | 2011-235717 A | | 11/2011 | | |
| JP | 2012-148647 A | | 8/2012 | | |
| JP | 2012-245823 A | | 12/2012 | | |
| JP | 2012245955 A | * | 12/2012 | .............. | B60G 3/20 |
| JP | 2013-010472 A | | 1/2013 | | |
| JP | 5516724 B | | 6/2014 | | |
| JP | 5522254 B | | 6/2014 | | |

OTHER PUBLICATIONS

Office Action received for Japanese Patent application No. 2015-064602, dated Sep. 6, 2016, 6 pages of office action including 4 pages of English translation.

* cited by examiner

FRONT OF VEHICLE

RECTIFYING DEVICE

CROSS-REFERENCE TO RELATED APPLICATIONS

The present application claims priority from Japanese Patent Application No. 2015-064602 filed on Mar. 26, 2015, the entire contents of which are hereby incorporated by reference.

BACKGROUND

1. Technical Field

The present disclosure relates to a rectifying device provided in a lower part of the body of a vehicle, such as a car. The present disclosure particularly relates to a rectifying device that suppresses vehicle body vibration due to aerodynamics by a simple configuration.

2. Related Art

With regard to cars, such as passenger cars, providing various rectifying devices has been proposed for the purpose of rectifying air current formed under the vehicle body during travel (traveling wind) to reduce air resistance and forming negative pressure (down force) to improve traveling stability.

For instance, Japanese Unexamined Patent Application Publication (JP-A) No. 2001-018851 discloses covering the front underside of an engine room with a front under cover to reduce air resistance and causing a projection with a predetermined shape to project downward.

JP-A No. 2004-306935 discloses causing rectifying members forming a V-like shape narrowed toward the front side, in a planer view of the vehicle, to project from the underside of the floor, thereby forming a negative-pressure area at the center of an underfloor part behind the rectifying members.

JP-A No. 2007-22149 discloses driving a movable air balance member that is provided in the front of a front wheel, for instance, and rectifies air current during travel, by a driving device disposed above and apart from the air balance member.

JP-A No. 2009-90681 discloses disposing a plurality of airfoil-shaped rectifying fins apart from each other in the vehicle width direction in an underfloor part of the vehicle body.

JP-A No. 2009-248746 discloses rotating a plurality of fins projecting downward from an underfloor part of the vehicle body around the vertical axis in conjugation with the steering operation of steering wheels.

JP-A No. 2011-57147 discloses forming, for the purpose of achieving both the generation of down force and the reduction in air resistance, a projection having a triangular cross section and extending in the vehicle width direction behind a plurality of rectifying fins that extend along the vehicle longitudinal direction and are distributed in the vehicle width direction.

JP-A No. 2011-235717 discloses providing a guide member in the front of a floor tunnel for the purpose of suppressing interference between air current from inside an engine room and traveling wind from in front of the vehicle and achieving both aerodynamics performance and cooling performance.

JP-A No. 2012-245823 discloses providing a rectifying fin having airfoil thickness and getting thinner toward the sides on the rear-vehicle floor surface and providing vertical ailerons on the sides of the rectifying fin.

JP-A No. 2013-010472 discloses forming a rectifying plate projecting downward on an under cover of an engine, which is on the underside of the front of the vehicle body, and providing hole parts behind the rectifying plate.

Japanese Patent No. 5516724 and Japanese Patent No. 5522254 disclose providing, in front of the front wheels, deflectors projecting downward and having a portion projecting frontward in a planar view.

SUMMARY OF THE INVENTION

In recent years, it has been found that vehicle body vibration is caused by periodic pressure fluctuation in the vicinity of a predetermined portion of an underside part of a vehicle body.

It is presumed that such vibration due to aerodynamics is caused when, for instance, air current flowing along the floor surface of the vehicle is separated at a suspension arm (lower link) of a rear suspension projecting downward from the floor, to become turbulence accompanying pressure fluctuation with a relatively low frequency, and this turbulence re-approaches the floor on the rear side of the vehicle.

When such turbulence interferes with main current that flows through the center of the vehicle body, and a region where pressure fluctuates with a low frequency of approximately several hertz, for instance, is formed near a rear end of the vehicle body, the fluctuation serves as vibratory force on the vehicle body and excites pitching vibration of the vehicle.

Regarding this disadvantage, it is possible to achieve rectification by covering the floor surface of the rear of the vehicle body with a cover for rectification. In this case, however, the need for providing a large-sized rectifying member brings concerns for increases in weight and cost.

In view of the above problems, an object of the present disclosure is to provide a rectifying device that suppresses vehicle body vibration due to aerodynamics by a simple configuration.

The present disclosure solves the above problems by the following solutions.

According to a first aspect of the present disclosure, a rectifying device includes: a rectifying member that is provided on a rear side of a vehicle with respect to a constituent member of a suspension device to extend substantially along a vehicle width direction and project downward, the constituent member of the suspension device being disposed to at least partly project from an underside part of a vehicle body and having a lower end disposed to be inclined in a front view of the vehicle. A lower edge of the rectifying member projects downward beyond the constituent member, and is inclined in a same direction as the lower end of the constituent member in the front view of the vehicle.

The constituent member of the suspension device may be a lower link of a rear suspension device that supports rear wheels.

The lower edge of the rectifying member may be inclined to be substantially parallel to the lower end of the lower link in the front view of the vehicle.

The rectifying member may be fixed to the vehicle body on the rear side of the vehicle with respect to the suspension device. The lower edge of the rectifying member may be disposed to project downward beyond the lower end of the constituent member when the vehicle has a vehicle height in normal travel.

The rectifying member may be fixed to the constituent member.

DETAILED DESCRIPTION

Hereinafter, preferred examples of the present disclosure will be described in detail with reference to the appended drawings. Note that, in this specification and the appended drawings, structural elements that have substantially the same function and structure are denoted with the same reference numerals, and repeated explanation of these structural elements is omitted.

The present disclosure has achieved the object of providing a rectifying device that suppresses vehicle body vibration due to aerodynamics by a simple configuration by providing, behind a lower link of a rear suspension, a rectifying member whose lower edge projects downward beyond the lower link and is inclined substantially along the inclination of the lower link.

EXAMPLE 1

Hereinafter, Example 1 of a rectifying device to which the present disclosure is applied will be described.

The rectifying device of the example is, for instance, provided in a lower part of the body of a car, such as a passenger car.

Figure 1:
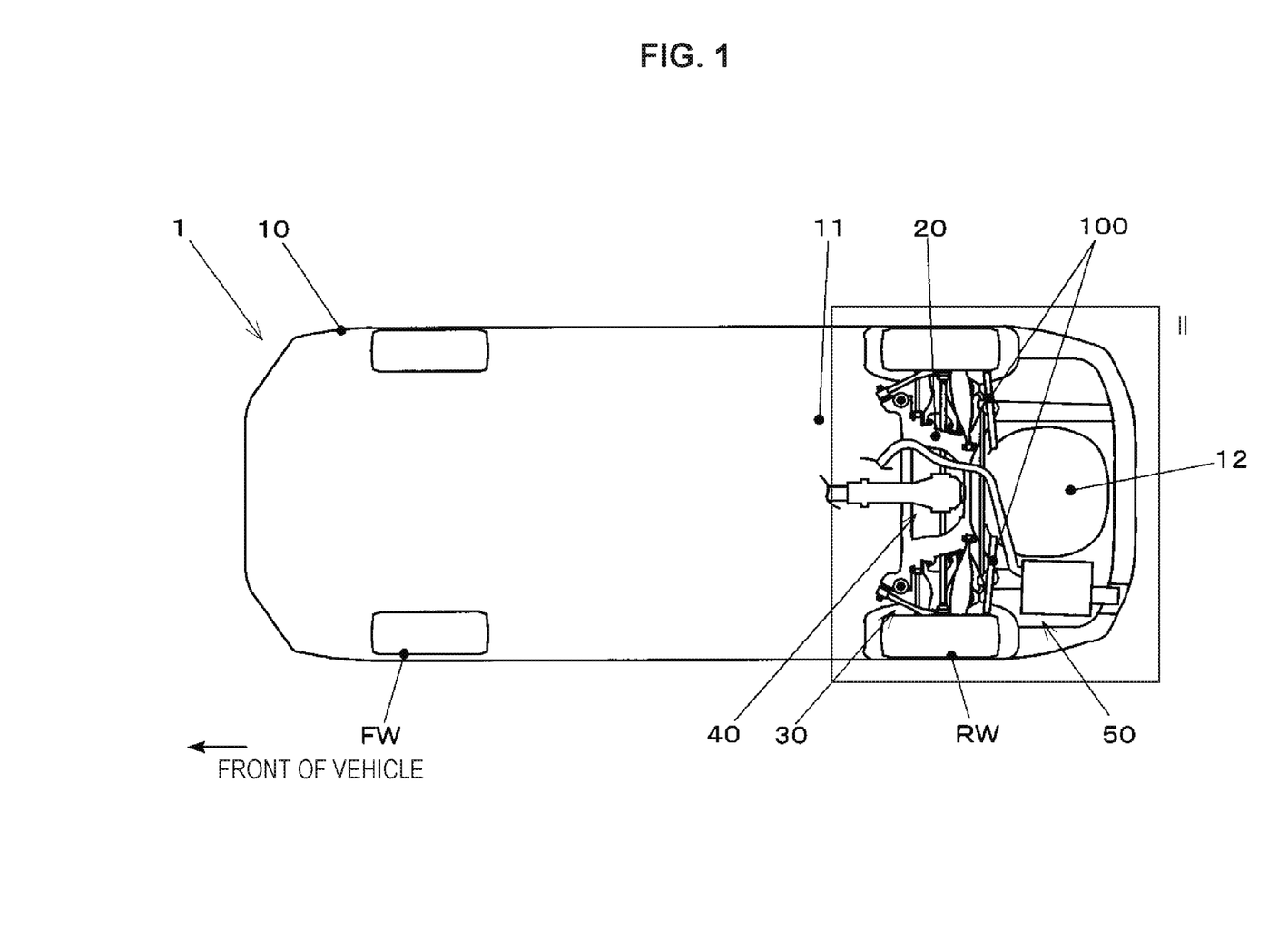
FIG. 1 schematically illustrates a lower part of the body of a vehicle including Example 1 of a rectifying device to which the present disclosure is applied.

FIG. 1 schematically illustrates a lower part of the body of a vehicle including the rectifying device of Example 1.

FIG. 1 is a planar view of the vehicle body, as seen from the lower side in the vertical direction.

Figure 2:
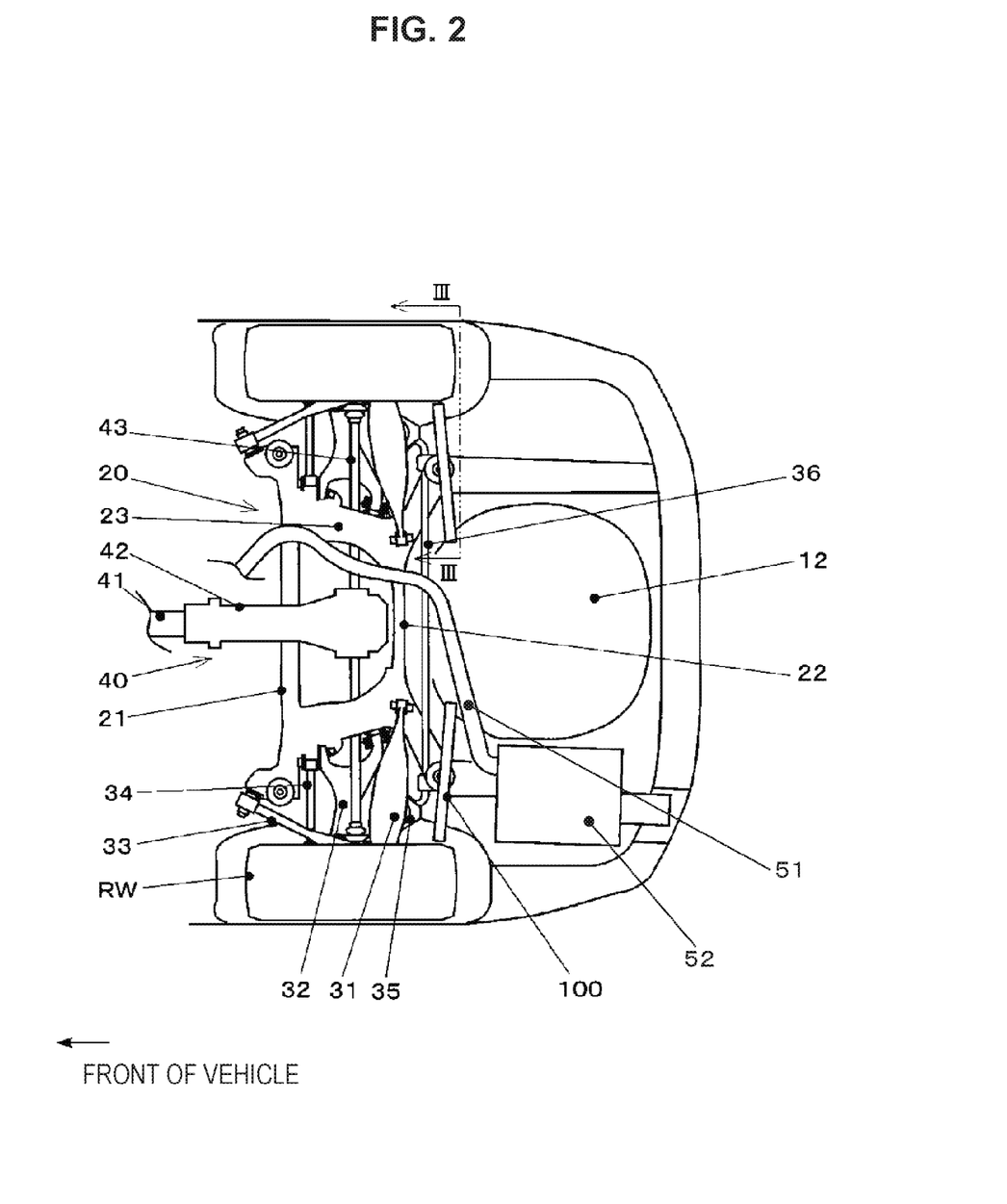
FIG. 2 is an enlarged view of a section II of FIG. 1.

FIG. 2 is an enlarged view of a section II of FIG. 1.

Figure 3:
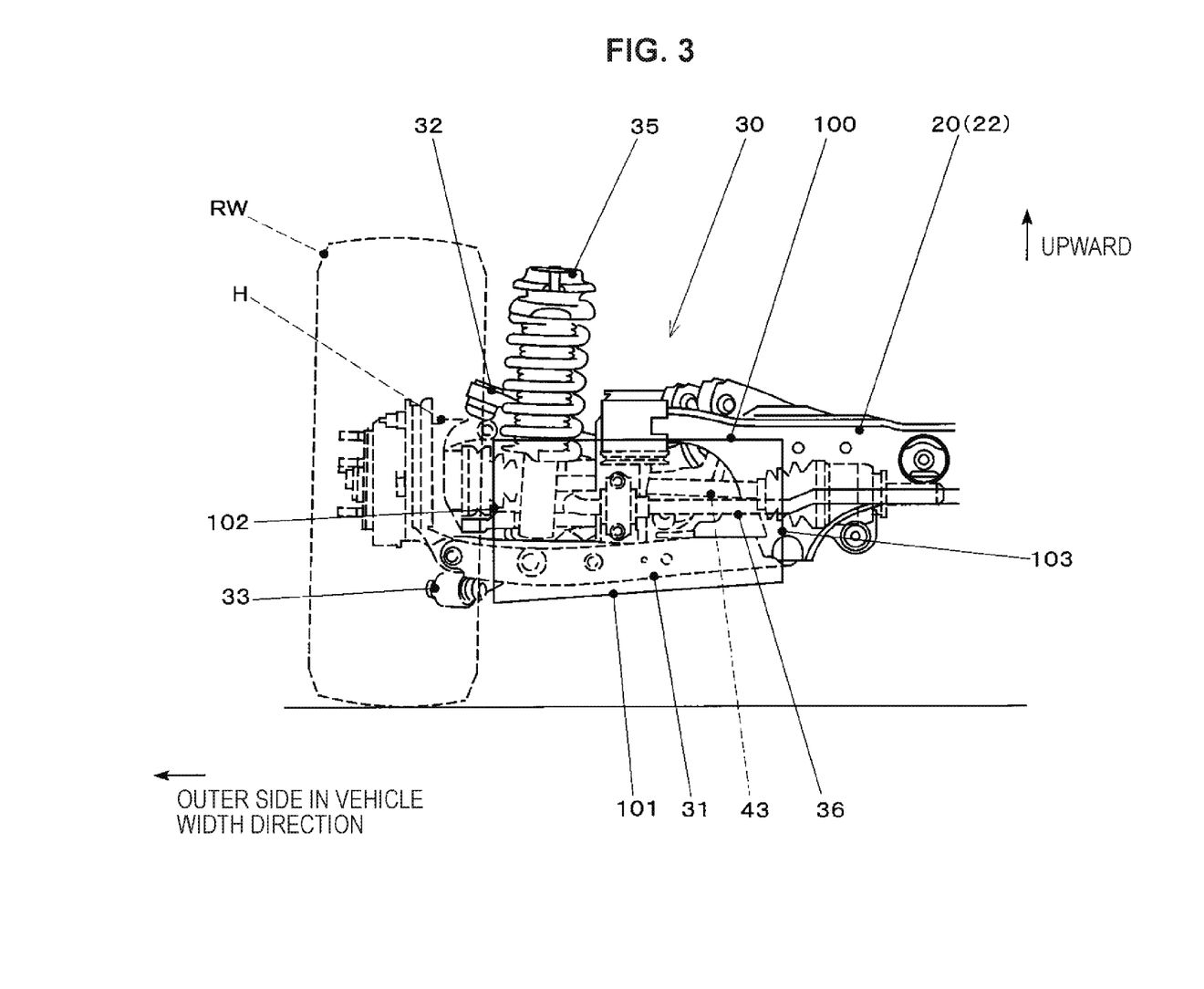
FIG. 3 is a horizontally-flipped arrow view of a section III-III of FIG. 2.

FIG. 3 is a horizontally-flipped arrow view of a section III-III of FIG. 2.

A vehicle 1 is a four-wheeled passenger car including left-and-right pairs of front wheels FW and rear wheels RW.

A vehicle body 10 includes a floor panel 11 serving as an underside part.

In the wheelbase, the floor panel 11 is formed in a substantially planar shape, except for unevenness due to a floor tunnel and the like, to constitute a floor surface part of a vehicle compartment (cabin) that accommodates passengers and the like.

A spare tire pan 12 is formed in the rear of the floor panel 11.

The spare tire pan 12 is formed, to accommodate a spare tire and the like, by causing the floor surface of a luggage room in the rear of the vehicle body to jut out downward.

A rear subframe 20, a rear suspension device 30, a driving force transmission device 40, an exhaust device 50, and the like are provided on the underfloor side in the rear of the vehicle body 10.

The rear subframe 20, which is provided between the left-and-right rear wheels RW, is a structural member with a grid shape to which the rear suspension device 30, a differential 42 of the driving force transmission device 40, and the like are attached.

The rear subframe 20 includes a front member 21, a rear member 22, side members 23, and the like, which are hollow beams each formed by assembling and welding pressed steel members.

The front member 21 and the rear member 22 extend substantially along the vehicle width direction and are disposed apart from each other in the vehicle longitudinal direction.

The side member 23 links regions in the vicinity of side ends of the front member 21 and the rear member 22 and extends substantially along the vehicle longitudinal direction.

The side members 23 are provided as a pair, apart from each other in the vehicle width direction.

The rear subframe 20 is joined to a lower part of the vehicle body 10 via cylindrical rubber bushes for anti-vibration provided at both ends of the front member 21 and the rear member 22.

The rear suspension device 30 supports a housing H, by which the rear wheel RW is rotatably supported, such that the housing H can undergo relative displacement within a predetermined suspension stroke with respect to the rear subframe 20.

The rear suspension device 30 is a double wishbone suspension including a lower link 31, an upper link 32, a trailing link 33, a toe control link 34, a damper spring unit 35, a stabilizer device 36, and the like.

The lower link 31, the upper link 32, the trailing link 33, and the toe control link 34 are suspension arms (links), both ends of which are swingably linked to the respective ones of the rear subframe 20 and the housing H.

The lower link 31 and the upper link 32 are disposed substantially along the vehicle width direction apart from each other in the vertical direction.

The lower link 31 is provided across a lower part in the vicinity of a rear end of the side member 23 of the rear subframe 20 and a lower part in the vicinity of a rear end of the housing H.

The upper link 32 is provided across an upper part of the side member 23 of the rear subframe 20 and an upper part of the housing H.

The lower link 31 and the upper link 32 mainly have a function of collaboratively positioning the rear wheel RW in the camber direction.

As illustrated in FIG. 3, a lower end (lower edge) of the lower link 31 is disposed to be inclined with respect to the vehicle width direction (horizontal direction) such that an end on the outer side in the vehicle width direction (rear wheel RW side) is lower than an end on the inner side in the vehicle width direction (rear subframe 20 side).

In addition, the lower end of the lower link 31 is disposed so as to project downward beyond the floor panel 11 on the front side with respect to the rear subframe 20, during normal travel of the vehicle (for instance, when the vehicle travels at a constant speed on a flat road in a normal loading condition).

The trailing link 33 is disposed across a side end of the front member 21 of the rear subframe 20 and a front lower part of the housing H.

The trailing link 33 is disposed substantially along the vehicle longitudinal direction to be inclined such that a rear end, which is on the housing H side, is located on the outer side in the vehicle width direction and on the lower side with respect to a front end, which is on the rear subframe 20 side.

The trailing link 33 mainly has a function of positioning the rear wheel RW in the longitudinal direction.

The toe control link 34 is provided across the vicinity of a front end of the side member 23 of the rear subframe 20 and the front of the housing H.

The toe control link 34 is disposed substantially along the vehicle width direction.

The toe control link 34 mainly has a function of positioning the rear wheel RW in the toe direction.

The damper spring unit 35 is a member obtained by unitizing a configuration in which part of a hydraulic damper (shock absorber), which generates damping force corresponding to extension and contraction speed, is inserted into the inner diameter side of a coil spring disposed on substantially the same axis.

The damper spring unit 35 is disposed such that its extension and contraction direction extends substantially along the vertical direction, as illustrated in FIG. 3.

An upper end and a lower end of the damper spring unit 35 are linked to the vehicle body 10 and the lower link 31, respectively, via rubber mounts for anti-vibration.

The stabilizer device 36 includes a stabilizer bar that is formed using a linear member made of spring steel and links the left-and-right lower links 31.

When the left-and-right lower links 31 have different strokes, the stabilizer device 36 generates reaction force in the restoring direction (direction in which the strokes of the left-and-right lower links 31 become equal), thereby improving roll stiffness in turning.

The driving force transmission device 40 transmits, to the left-and-right rear wheels RW, driving force output from an engine (not illustrated) in the front of the vehicle body via a transmission (not illustrated).

The driving force transmission device 40 includes a propeller shaft 41, the differential 42, drive shafts 43, and the like.

The propeller shaft 41 is a rotation shaft that transmits driving force transmitted from the transmission to the differential 42.

The propeller shaft 41 extends substantially along the vehicle longitudinal direction, and is accommodated in the floor tunnel formed by depressing the center of the floor panel 11, which is in a lower part of the cabin, in the vehicle width direction.

The differential 42 transmits driving force input from the propeller shaft 41 to the left-and-right drive shafts 43.

The differential 42 includes a final reduction mechanism, a differential mechanism that absorbs a difference in rotation speed between the left-and-right rear wheels RW, and the like.

The drive shafts 43 are rotation shafts that transmit power from the differential 42 to hub parts of the left-and-right rear wheels RW.

The drive shaft 43 has constant velocity joints that allow the stroke of the rear suspension device 30 at both ends.

The exhaust device 50 exhausts gas from the engine (not illustrated).

The exhaust device 50 includes an exhaust pipe 51, a silencer 52, and the like.

The exhaust pipe 51 extends from the engine in the front of the vehicle body to the rear of the vehicle body through the floor tunnel, and goes under the rear subframe 20 to be connected with the silencer 52.

The silencer 52 is provided in the vicinity of a rear end of the exhaust pipe 51.

The silencer 52 is hung under the floor panel 11 beside the spare tire pan 12.

In addition, the vehicle body 10 is provided with flaps 100 serving as rectifying members.

The flap 100 is a flat-plate member that projects downward like a partition from the floor panel 11 of the vehicle body 10 on the rear side of the vehicle with respect to the rear suspension device 30.

The flap 100 has a function of separating, from the vehicle body 10, turbulence generated by traveling wind interfering with the lower link 31.

The flap 100 extends substantially along a plane parallel to the vertical direction and the vehicle width direction.

The flaps 100 are disposed, as a left-and-right pair, behind the respective ones of the left-and-right lower links 31 of the rear suspension device 30.

As illustrated in FIG. 2, in a planar view, as seen from under the vehicle body, the flap 100 is disposed adjacent to a rear edge of the lower link 31, with an inevitable gap due to the operation of the rear suspension device 30 located therebetween, and substantially parallel to the rear edge of the lower link 31.

As illustrated in FIG. 3, as seen in the vehicle longitudinal direction, a lower edge 101 of the flap 100 is disposed to project downward beyond the lower end of the lower link 31 for the whole length in the vehicle width direction.

The lower edge 101 is inclined in substantially the same direction and at substantially the same angle as the lower end of the lower link 31.

A side edge 102 of the flap 100 on the outer side in the vehicle width direction is disposed adjacent to a side surface part of the rear wheel RW on the inner side in the vehicle width direction.

A side edge 103 of the flap 100 on the inner side in the vehicle width direction is disposed in substantially the same position in the vehicle width direction as the position of an end of the lower link 31 on the inner side in the vehicle width direction.

Hereinafter, the effect of the above-described Example 1 is described in comparison with the following reference example of the present disclosure.

In this reference example and Example 2 described later, portions that are common to those of the above-described Example 1 are denoted by the same reference numerals and omitted from description, and differences are mainly described.

Figure 4:
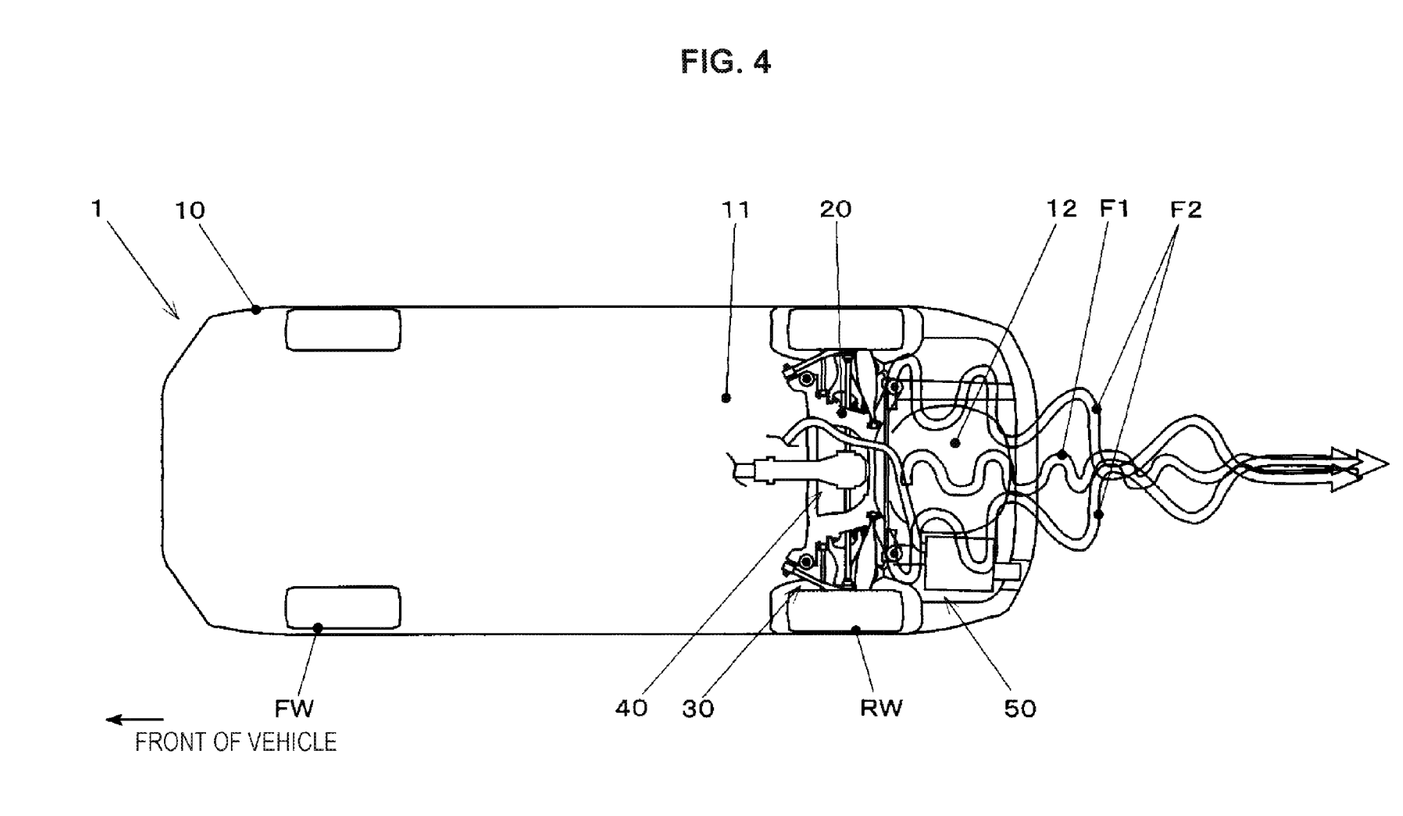
FIG. 4 schematically illustrates a lower part of the body of a vehicle, which is a reference example of the present disclosure, and the behavior of traveling wind.

A vehicle of the reference example has substantially the same configuration as the configuration of the vehicle including the rectifying device of Example 1, except that the rectifying members, i.e., the flaps 100, are removed.

In the vehicle of the reference example, air current (traveling wind) that flows around the vehicle traveling exhibits the following behavior.

First, an air current F1 is formed in a region at the center in the vehicle width direction with a relatively high flow speed. The air current F1 is separated, as turbulence, from air current flowing along the underside of the floor panel 11 at the rear subframe 20, the differential 42, the exhaust pipe 51, and the like.

Pressure fluctuates in a predetermined cycle inside and around the air current F1.

Meanwhile, air currents F2 are formed in regions on the sides with flow speeds lower than that at the center in the vehicle width direction (regions located near the lower links 31 in the vehicle width direction). The air current F2 is separated, as turbulence, from air current flowing along the underside of the floor panel 11 at the lower link 31.

Pressure fluctuates in a predetermined cycle around the air current F2.

Here, the air current F2 has a lower flow speed and a lower frequency of pressure fluctuation than those of the air current F1.

In the reference example, the air current F2 having a low flow speed and low-frequency fluctuation generated at the lower link 31 is drawn by the air current F1, which is relatively fast main current, to cause interference; thus, turbulence exhibiting relatively large low-frequency pressure fluctuation is formed.

Such turbulence repeats separation from the vehicle body and reattachment to the vehicle body at the underside of the spare tire pan 12, and applies an exciting force of approximately 1 Hz to 4 Hz, for instance, to the vehicle body 10.

This consequently causes vibration of the vehicle body 10 in the pitching direction and degrades riding comfort.

In contrast, according to Example 1, the flap 100 is provided behind the lower link 31. The lower edge 101 of the flap 100 projects downward beyond the lower link 31 of the rear suspension device 30 and is inclined to be substantially parallel to the lower link 31. Thus, turbulence generated at the lower link 31 can be surely separated from the vehicle body 10, and the turbulence can be prevented from exciting the vehicle body while repeating attachment to and separation from the vehicle body and causing vehicle body vibration.

EXAMPLE 2

Next, Example 2 of a rectifying device to which the present disclosure is applied is described.

In a rectifying device of Example 2, the flap 100 is fixed to the lower link 31 of the rear suspension device 30, instead of fixing the flap 100 to the vehicle body 10 side as in Example 1.

The lower edge 101 of the flap 100 is disposed such that its positional relation to the lower end of the lower link 31 is substantially the same as that of the rectifying device of Example 1 during normal travel of the vehicle 1.

Example 2 provides substantially the same effect as the above-described effect of Example 1. In addition, Example 2 allows the lower edge 101 of the flap 100 to be constantly kept lower than the lower end of the lower link 31 even when a change in loading condition, turning, traveling on an uneven ground, or the like causes the stroke of the rear suspension device 30.

As described above, according to the examples of the present disclosure, a rectifying device that suppresses vehicle body vibration due to aerodynamics by a simple configuration can be provided.

(Modification)

The present disclosure is not limited to the examples described above, and various modifications or changes can be made, and these are also within the technical scope of the present disclosure.

The configurations of the vehicle body, the suspension device, and the rectifying device can be changed as appropriate without being limited to the above-described examples.

For instance, the vehicle body shape and the form of the suspension can be changed as appropriate.

In addition, although left-and-right separate rectifying members are provided in the examples, rectifying members integrated by being linked in the vehicle width direction may be used.

(2) Although the rectifying device of each example is provided behind the suspension device for the rear wheels, a rectifying device of the present disclosure may be provided behind a suspension device for the front wheels.

(3) The flap is not necessarily fixed to the vehicle body or a constituent member of the suspension, and may be a movable flap driven by an actuator. For instance, a configuration may be adopted in which vehicle speed and road conditions are determined, and the flap is caused to project only in a region exhibiting significant vehicle body vibration due to aerodynamics and is retracted in the other regions so as to reduce air resistance.

Although the preferred examples of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. A rectifying device, comprising:
a rectifying member on a rear side of a vehicle with respect to a constituent member of a suspension device to extend along a plane parallel to a vertical direction and a vehicle width direction, and the rectifying member projects downward in the vertical direction, the constituent member of the suspension device at least partly projects from an underside part of a vehicle body, the constituent member having a lower end which is inclined in a front view of the vehicle,
wherein a lower edge of the rectifying member projects downward beyond the constituent member, the lower edge is inclined in a same direction as the lower end of the constituent member in the front view of the vehicle and a side edge of the rectifying member on an outer side in the vehicle width direction is adjacent to a side surface part of a rear wheel on an inner side in the vehicle width direction, and
wherein the constituent member of the suspension device is a lower link of a rear suspension device that supports rear wheels.

2. The rectifying device according to claim 1,
wherein the lower edge of the rectifying member is inclined to be parallel to the lower end of the lower link in the front view of the vehicle.

3. The rectifying device according to claim 2,
wherein the rectifying member is fixed to the vehicle body on the rear side of the vehicle with respect to the suspension device, and
wherein the lower edge of the rectifying member projects downward beyond the lower end of the constituent member when the vehicle has a vehicle height in normal travel.

4. The rectifying device according to claim 1,
wherein the rectifying member is fixed to the vehicle body on the rear side of the vehicle with respect to the suspension device, and
wherein the lower edge of the rectifying member projects downward beyond the lower end of the constituent member when the vehicle has a vehicle height in normal travel.

5. A rectifying device, comprising:
a rectifying member on a rear side of a vehicle with respect to a constituent member of a suspension device to extend along a vehicle width direction and project downward, the constituent member of the suspension device at least partly projects from an underside part of a vehicle body, the constituent member having a lower end which is inclined in a front view of the vehicle, wherein a lower edge of the rectifying member projects downward beyond the constituent member when the vehicle has a vehicle height in normal travel, the lower edge is inclined in a same direction as the lower end of the constituent member in the front view of the vehicle, wherein the constituent member of the suspension device is a lower link of a rear suspension device that supports rear wheels, and wherein the rectifying member is fixed to the vehicle body on the rear side of the vehicle with respect to the suspension device.

\* \* \* \* \*